Patented Mar. 18, 1947

2,417,462

UNITED STATES PATENT OFFICE 2,417,462

TREATMENT OF TRICALCIUM PHOSPHATE FOR IMPROVING FLUORINE ADSORPTIVENESS

Howard Adler, Flossmoor, Ill., assignor to Victor Chemical Works, a corporation of Illinois No Drawing. Application August 24, 1938, Serial No. 226,576

4 Claims. (Cl. 23—109)

This invention relates to a method of treating water, particularly drinking water, for the removal of fluorine therefrom.

There have been a large number of suggestions for the removal of fluorine from water by the use of various materials, but in general these require either a change in the pH value of the water, or do not sufficiently remove the fluorine.

It has now been discovered that the precipitation of large amounts of tricalcium phosphate in fluorine-bearing water, or the contacting passage of such water with already precipitated tricalcium phosphate will efficiently remove fluorine down to as low as one part per million or less.

In order to remove the fluorine efficiently, the tricalcium phosphate under ordinary precipitating conditions must be present in a concentration at least equal to 200 parts per part of fluorine to be removed. The precipitation of tricalcium phosphate in the water appears to be substantially more effective than the addition of already precipitated material to the water, or the passage of the water through a bed of tricalcium phosphate.

The tricalcium phosphate should be in the ordinary hydroxy form, i. e. in which the $CaO:P_2O_5$ ratio is more than 3 to 1. Ordinary commercial tricalcium phosphate is of this type, as is any normally precipitated tricalcium phosphate. The usual commercial grade prepared at a pH of 6.8 to 7.0 has a formula of approximately $$3Ca_3(PO_4)_2 \cdot Ca(OH)_2$$

The following are examples of the process carried out under conditions where the chemical efficiency of the process could readily be checked to show accurately the actual chemical analyses and to provide more accurate control of all of the factors.

As an example of the invention, 40 grams of regular commercial grade tricalcium phosphate were placed in a tower having a cross section of 0.3 sq. inch to provide a filter bed about 14.5 inches in height. 3000 cc. of water containing 30 P. P. M. of fluorine in the form of sodium fluoride were percolated through the bed at the rate of 12.5 cc. per minute. The fluorine content of the water was reduced to 0.3 P. P. M. The pH value of the water was 6.3. The phosphate used was equivalent to approximately 450 parts of tricalcium phosphate to one part of fluorine removed.

On the other hand, a sample of Chicago Heights water was diluted with distilled water to give a concentration of approximately 300 P. P. M. of calcium hardness. Sufficient sodium fluoride was added to give a fluorine content of 11.4 P. P. M. The water was then softened by the addition of trisodium phosphate, with resultant precipitation of tricalcium phosphate. The fluorine content of the water was found to be 10.2 P. P. M., showing no substantial change in the fluorine content.

The softened water from the previous example was then treated with 0.5% of commercial grade tricalcium phosphate and thoroughly agitated. The fluorine content of the water was reduced by this treatment to 0.8 P. P. M.

Instead of adding the tricalcium phosphate in that form, the process may readily be carried out by the production of tricalcium phosphate in the water providing that sufficient lime is made available to produce the large excess of tricalcium phosphate required. For example, 500 cc. of water containing 30 P. P. M. of fluorine was treated with sufficient milk of lime to give a water containing the equivalent of 6000 P. P. M. of hardness (calculated as $CaCO_3$). The water was then softened by the addition of dilute phosphoric acid to cause precipitation of tricalcium phosphate. The precipitate was filtered off, yielding water containing only 0.2 P. P. M. of fluorine and 60 P. P. M. of hardness. The water had a pH value of 7.01.

By controlling the pH value, the hardness may likewise be reduced. For example, at 7.31 pH, the hardness in a similar case was reduced to only 6 P. P. M. and at pH's of 8 or above substantially complete softening may be obtained. Inasmuch as most fluorine containing natural waters are alkaline with pH's of 7.5 to 8.5, the process of this example may be used not only to remove fluorine, but to soften to the required amount.

Under certain conditions, an activated tricalcium phosphate may be produced. The product is normally made by reacting 6 to 8° Baumé milk of lime with 15° Baumé phosphoric acid. If instead of these solutions a considerably more dilute slurry of milk of lime, for example a 1° Baumé slurry, is neutralized with a more dilute phosphoric acid, for example, a 6° Baumé acid, the resulting precipitated tricalcium phosphate has a more gelatinous appearance and is considerably more active. Tricalcium phosphate made in this manner had a fluorine adsorption capacity about one-third greater than regular grade tricalcium phosphate.

For example, a tower filter bed was made up with a more gelatinous tricalcium phosphate which had been dried 48 hours in a steam oven. Particles of 30 to 80 mesh were used. Water containing 30 P. P. M. of fluorine was passed over the bed and it was found that one pound of tricalcium phosphate would adsorb 2.02 grams of fluorine in the production of water with less than 1 P. P. M. of fluorine. This is equivalent to 225 parts of tricalcium phosphate to 1 part of fluorine removed.

Best results have been obtained by precipitating the tricalcium phosphate in water having a pH between 7.0 and 7.5. In some cases the fluorine adsorptiveness has been as high as 1 part of fluorine for 167 parts of tricalcium phosphate and ratios of 1 to 200 are common.

In cases where water is percolated through a bed of tricalcium phosphate, the spent phosphate may be regenerated by washing it with a dilute caustic soda solution. In household use, however, it is generally preferable to discard the spent material.

In commercial use, washing with caustic is preferably carried out. In some instances the washing may precede the first removal of fluorine in order to activate otherwise inactive material. After washing with caustic soda solution the material is preferably treated with a dilute hydrochloric acid solution to neutralize the excess free caustic soda.

Trimagnesium phosphate may be substituted for tricalcium phosphate, but it is more expensive and has a somewhat lower efficiency than the tricalcium phosphate.

This application is a continuation-in-part of my co-pending application Serial No. 108,496, filed October 30, 1936.

The foregoing detailed description has been given for clearness of understanding only and no unnecessary limitations should be understood therefrom.

I claim:

1. The method of treating a compound of the class consisting of hydroxy tricalcium phosphate and trimagnesium phosphate to improve the fluorine adsorptiveness thereof which comprises contacting a fluorine-containing compound of said class with a weak aqueous solution of an alkali to remove fluorine therefrom, and then treating the alkalized material with a dilute hydrochloric acid solution to neutralize excess alkali.

2. A process for regenerating tricalcium phosphate which has been utilized for removing fluorine from water which comprises treating the tricalcium phosphate with a solution of an alkali, and subsequently with an acid.

3. The process for regenerating tricalcium phosphate which has been utilized for removing fluorine from water which comprises treating the tricalcium phosphate with a solution of sodium hydroxide, and subsequently with hydrochloric acid.

4. The process for activating tricalcium phosphate for utilization in removing fluorine from water which comprises treating the tricalcium phosphate with a solution of sodium hydroxide, and subsequently with hydrochloric acid.

HOWARD ADLER.

REFERENCES CITED

The following references are of record in the file of this patent:

UNITED STATES PATENTS

| Number | Name | Date |
|---|---|---|
| 913,034 | McMurtrie | Feb. 23, 1909 |
| 1,930,885 | Rittler | Oct. 17, 1933 |
| 1,979,926 | Zinn | Nov. 6, 1934 |
| 2,000,197 | Smith | May 7, 1935 |
| 2,122,122 | Woodstock | June 28, 1938 |
| 2,126,793 | MacIntire | Aug. 16, 1938 |
| 2,059,553 | Churchill | Nov. 3, 1936 |
| 1,986,963 | Evans et al. | Jan. 8, 1935 |
| 370,583 | Williams | Sept. 27, 1887 |
| 450,243 | Liesenberg | Apr. 14, 1891 |
| 1,572,944 | Newman | Feb. 16, 1926 |
| 1,693,066 | White | Nov. 27, 1928 |
| 1,699,257 | Travers | Jan. 15, 1929 |
| Re. 20,754 | Rosenstein | June 7, 1938 |
| 2,072,376 | McKee et al. | Mar. 2, 1937 |
| 197,834 | Designolle | Oct. 11, 1877 |
| 301,015 | Sommers | June 24, 1884 |
| 2,079,847 | Fiske | May 11, 1937 |
| 2,257,111 | Elvove | Sept. 30, 1941 |
| 2,262,745 | Adler | Nov. 18, 1941 |
| 1,709,284 | Sauer | Apr. 16, 1929 |
| 1,221,554 | McCaskell | Apr. 3, 1917 |
| 1,944,048 | Walker et al. | Jan. 16, 1934 |
| Re. 16,225 | Wooster | Dec. 15, 1925 |
| 1,221,553 | McCaskell | Apr. 3, 1917 |

FOREIGN PATENTS

| Number | Country | Date |
|---|---|---|
| 3,033 | British | 1860 |

OTHER REFERENCES

Modern Inorganic Chemistry, J. W. Mellor, pub. by Longmans Green & Co., 1922, pages 594 and 595.

Smith, "Potability of Water from the Standpoint of Fluorine Content."